United States Patent [19]
Bray et al.

[11] Patent Number: 5,841,028
[45] Date of Patent: Nov. 24, 1998

[54] AUTOMATED LIQUID-LEVEL VESSEL APPARATUS

[75] Inventors: Andrew Malcolm Bray, Boronia; Timothy Lloyd Belcher, Scoresby, both of Australia

[73] Assignee: Chiron Corporation, Emeryville, Calif.

[21] Appl. No.: 643,030

[22] Filed: May 2, 1996

[51] Int. Cl.⁶ .................................................. G01F 23/00
[52] U.S. Cl. ...................... 73/290 V; 137/395; 137/392; 73/390 R
[58] Field of Search .................... 73/290 V; 137/391, 137/395; 417/37

[56] References Cited

U.S. PATENT DOCUMENTS

| | | | |
|---|---|---|---|
| 2,619,906 | 12/1952 | Gardenhour | 417/37 |
| 3,028,875 | 4/1962 | Alguire | 137/391 |
| 3,219,051 | 11/1965 | Francis | 137/395 |
| 3,520,186 | 7/1970 | Adams et al. | |
| 3,715,173 | 2/1973 | Froescher | 417/37 |
| 3,809,116 | 5/1974 | Sanner | 137/391 |
| 4,063,457 | 12/1977 | Zekulin et al. | |
| 4,275,382 | 6/1981 | Jannotta | 340/151 |
| 4,316,183 | 2/1982 | Palmer et al. | |
| 4,610,164 | 9/1986 | Sobue et al. | |
| 4,787,240 | 11/1988 | McShane | |
| 5,155,472 | 10/1992 | Dam | |
| 5,351,036 | 9/1994 | Brown et al. | |
| 5,471,872 | 12/1995 | Cummings | |
| 5,483,226 | 1/1996 | Menut | |

FOREIGN PATENT DOCUMENTS

| | | | |
|---|---|---|---|
| 0084405 | 7/1983 | European Pat. Off. | G01F 23/28 |
| 84405 | 7/1983 | European Pat. Off. | |
| 0426622A1 | 5/1991 | European Pat. Off. | G01F 23/28 |
| 426622 A1 | 5/1991 | European Pat. Off. | |
| 1773251 B | 2/1972 | Germany | |
| 28 23 713 A1 | 6/1979 | Germany | |
| 8615817 | 6/1986 | United Kingdom | |

*Primary Examiner*—Ronald L. Biegel
*Assistant Examiner*—Jewel V. Thompson
*Attorney, Agent, or Firm*—LeeAnn Gorthey; Sharon M. Fujita; Robert P. Blackburn

[57] ABSTRACT

The invention relates to a vessel apparatus for holding and transferring liquids, in which the level of liquid may be controlled and monitored automatically. A depth sensing device, included in the apparatus, detects the presence or absence of liquid at predetermined levels. The device detects the difference in transmission of a low frequency electromagnetic signal between aerial probes based on the state of immersion (wet or dry) of the transmitting and receiving probes.

17 Claims, 2 Drawing Sheets

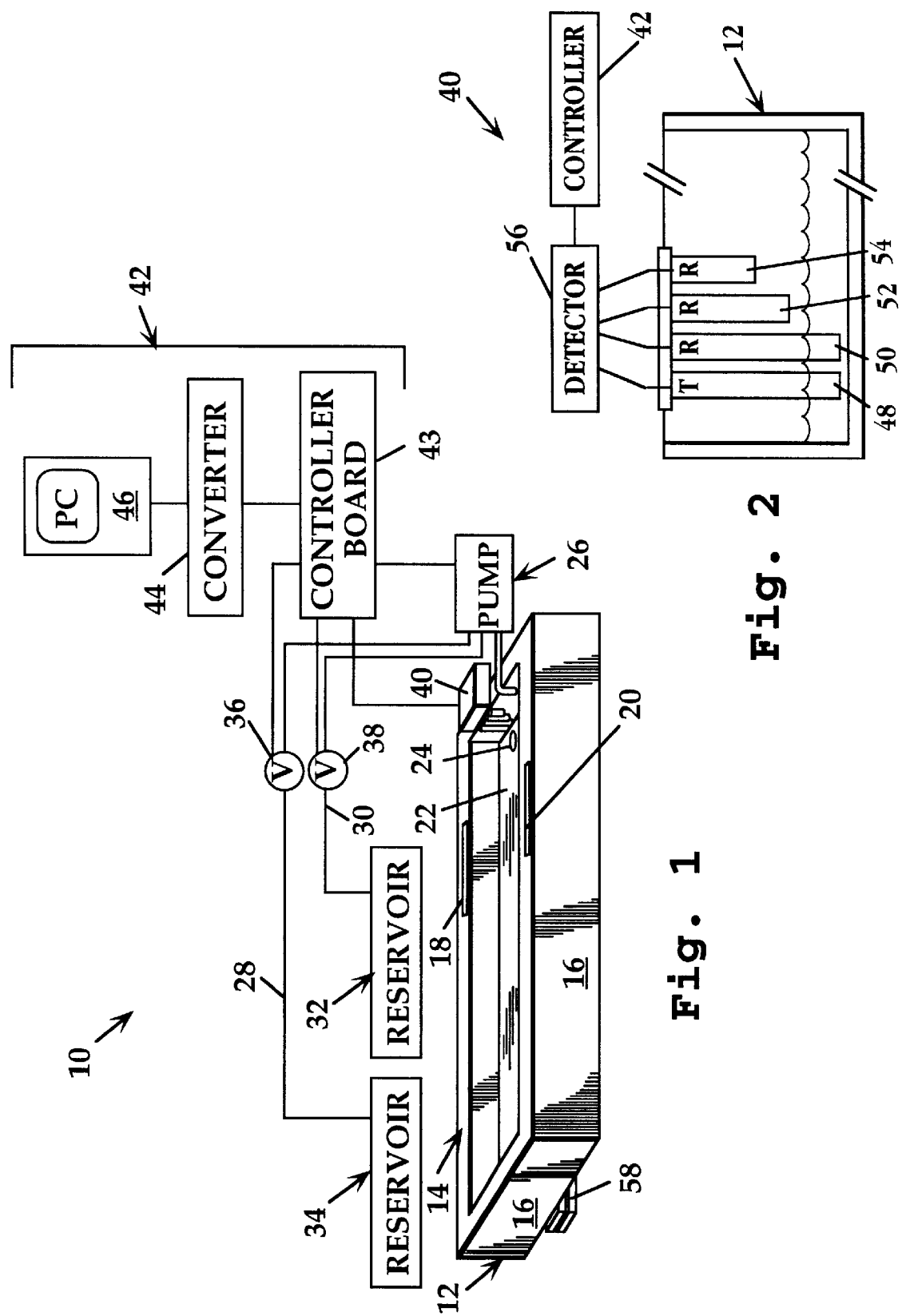

AUTOMATED LIQUID-LEVEL VESSEL APPARATUS

FIELD OF THE INVENTION

This invention relates to a vessel apparatus for holding and transferring liquids, and more particularly to a vessel apparatus in which the level of liquid may be controlled and monitored automatically. The invention also relates to a depth sensing device for detecting the level of liquid in such an apparatus.

REFERENCES

Adams, G. L. et al., U.S. Pat. No. 3,520,186 (July 1970).

Brown, D. P. et al., U.S. Pat. No. 5,351,036 (September 1994).

Cummings, C. A., U.S. Pat. No. 5,471,872 (December 1995).

Dam, N., U.S. Pat. No. 5,155,472 (October 1992).

Glasgow, G., GB Patent No. 2,177,510 (January 1987).

McShane, J. L., U.S. Pat. No. 4,787,240 (November 1988).

Menut, J.-B., U.S. Pat. No. 5,483,226 (January 1996).

Sobue, H. et al., JP Kokai No. 60-102525 (June 1985).

Sobue, H. et al., U.S. Pat. No. 4,610,164 (September 1986).

Zekulin, N. et al., U.S. Pat. No. 4,063,457 (December 1977).

BACKGROUND OF THE INVENTION

In many applications, it is desirable to monitor the level of liquid in a tank or similar vessel and adjust the level as necessary. Many previous level-detecting devices have relied on reflection of a wave of transmitted energy, frequently ultrasonic energy, off of a liquid surface to a receiver, which measures the time of propagation from the surface, the phase shift, or wave form of the reflected wave, to calculate the distance to the liquid surface (see, for example, Adams). This method suffers from a number of disadvantages. The direction of reflection of the propagated wave may be altered by turbulence at the liquid surface. Extraneous reflection can occur at surfaces such as the vessel surface or objects in the liquid. Time of propagation of a wave can be influenced by factors such as temperature, pressure, or presence of chemical vapors (Cummings).

Several devices have exploited the difference in propagation of a wave of ultrasonic energy through a liquid as opposed to a gas, thus enabling detection of the presence or absence of a liquid at a designated location (Glasgow, Adams, Dam, Sobue, Menut, Cummings). In several of these devices, reflection of the wave is included in the design. Thus, as in the reflection method above, orientation of the transmitting and receiving elements is important (Sobue 1986, Menut, Cummings). In order to the optimize the efficiency of reflection, the path length between the elements (Adams, Sobue 1985) or the thickness of a reflecting surface (Dam) is preferably based on the wavelength of the transmitted energy. Such precise control of the path length may be difficult to achieve in practice. The transmitter and receiver of the ultrasonic signal are generally piezoelectric transducers, formed of materials such as barium titanate or lead zirconate-titanate. Where path length is critical, these are preferably cut to resonate at a precise wavelength (e.g. Dam).

The operation of such probes is complicated by transmission through solid surfaces, particularly metal, on which the transmitting and receiving elements are mounted, resulting in extraneous "crosstalk" between elements. Even in more complex probes where transmission through the support is incorporated into the design (e.g. Menut), interference with transmission through air or liquid must be minimized. Methods used to reduce crosstalk include acoustic isolation of the transmitting and receiving elements, e.g. by use of a non-metallic support or physical isolation from a metallic support (Adams), use of structures that direct interfering transmission away from the receiver (Zekulin, McShane), or mounting the elements on a very thin-walled support (Menut). Alternatively, signal transmission through the solid support may be discriminated from transmission through the area in which liquid is to be detected by the time difference in propagation (Dam).

Most depth sensors of this type detect the presence or absence of liquid at a single given location. Zekulin employs multiple transmitter/receiver pairs to detect liquid at multiple levels. Acoustic isolation of the transducers, as well as adjustment of the relative orientation of the pairs of elements, is generally required to reduce crosstalk between these pairs. A depth probe described by Brown, which differs from the above devices in employing microwave rather than ultrasonic transmission, is mounted on an existing liquid level detection device, such as a window, and detects the presence or absence of liquid by reflection of microwaves through a series of waveguides. Multiple levels may be monitored, but this simply involves the use of several such probes, each separately connected to controlling electronic circuitry.

It is therefore desirable to provide a depth probe or sensing device which does not rely on reflection of waves and is less susceptible to interference from extraneous reflection or extraneous propagation through solid surfaces. It is also desirable to provide a probe which may detect liquid at several different levels and yet is simple and compact in design. The probe should be operable in various kinds of liquid media, both conductive and nonconductive, and including corrosive chemical media. Such a probe would be useful in, for example, monitoring liquid levels in a vessel, particularly when output from the probe may be used to adjust the liquid level by control of associated devices such as valves and pumps.

SUMMARY OF THE INVENTION

The present invention includes, in one aspect, an automated liquid-level vessel apparatus. The apparatus includes a vessel, which defines a container suitable for holding a liquid, means for adjusting the level of liquid in the container, and a sensing device for determining whether the level of liquid in the container is between lower and upper preselected levels. The sensing device includes a transmitter probe, which is effective to transmit an electromagnetic signal, and a receiver probe, both of which are positioned at or below the lower preselected level. At least one of the probes is positioned at the preselected level. In one embodiment, the transmitter probe and first receiver probe are both positioned at the lower preselected level. The sensing device further includes a second receiver probe positioned at the upper preselected level, and a detector, operatively connected to the receiver probes, for detecting direct electromagnetic signal transmission through the liquid from the transmitter probe. The vessel apparatus also includes controlling means operatively connecting the sensing device to the adjusting means to maintain the liquid level in the container between the preselected levels.

In one embodiment, the electromagnetic signal produced by the transmitter probe is in the frequency range between 200 and 2,000 Hz, and is preferably about 700 Hz.

In another embodiment, the apparatus further includes a third receiver probe positioned at a selected intermediate level between the upper and lower levels. The third probe is also connected to the detector, for detecting a liquid level in the container which is between the preselected upper and lower levels.

In another general embodiment, the controlling means of the apparatus is a microprocessor, and the liquid level adjusting means is a pump operatively associated with the microprocessor, whereby the level of liquid in the vessel may be adjusted in response to the sensing device.

The floor of the vessel may include a drain which is operably associated with the microprocessor, and the apparatus may further include a pneumatic jack operably associated with the microprocessor and effective to tilt the vessel to effect drainage. In a related embodiment, the floor of the vessel is sloped towards the drain.

The apparatus may be used for immersing blocks of solid state reaction pins in a liquid, in which case the vessel is provided with means for positioning the pins within the vessel, such as slots within the vessel walls.

In another aspect, the invention includes a sensing device for determining whether the level of liquid in a container is between lower and upper preselected levels. The sensing device includes a transmitter probe, effective to transmit an electromagnetic signal, and a first receiver probe, both of which are positioned at or below the lower preselected level. At least one of said probes is positioned at the preselected level. In one embodiment, the transmitter probe and first receiver probe are both positioned at the lower preselected level. A second receiver probe is positioned at the upper preselected level. A detector is connected to the receiver probes for detecting direct electromagnetic signal transmission through the liquid medium from the transmitter probe.

In one embodiment, the electromagnetic signal produced by the transmitter probe is in the frequency range between 200 and 2,000 Hz, and is preferably about 700 Hz.

In another embodiment, the sensing device further includes a third receiver probe positioned at a selected intermediate level between the upper and lower levels. The third probe is also connected to the detector, in order to detect a liquid level in the container which is between the preselected upper and lower levels.

In a preferred embodiment, each of the probes has a tip area for contact with the liquid, and the tip area has a tapered profile.

These and other objects and features of the invention will become more fully apparent when the following detailed description of the invention is read in conjunction with the accompanying drawings.

BRIEF DESCRIPTION OF THE DRAWINGS

FIG. 1 shows the automated liquid-level vessel apparatus of the invention;

FIG. 2 shows the sensing device of the invention; and

DETAILED DESCRIPTION OF THE INVENTION

I. Automated Vessel Apparatus

Figure 3:
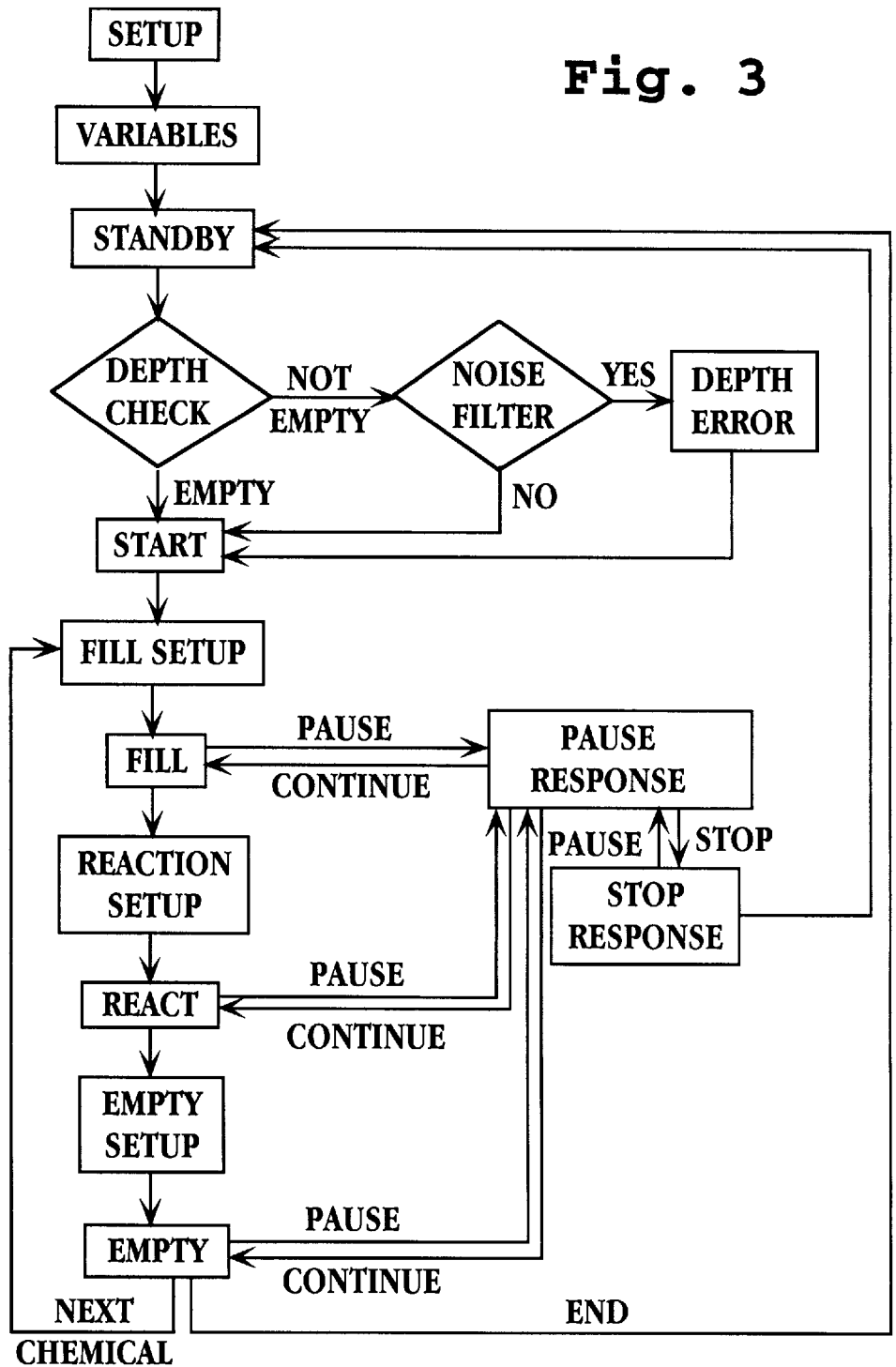
FIG. 3 shows a flow chart of a program used for operating the vessel apparatus of the invention.

FIG. 1 illustrates a vessel apparatus 10 in accordance with the present invention. The apparatus includes a vessel 12, which defines a container 14 suitable for holding a liquid. The container 14 is constructed of a corrosion resistant metal, e.g. aluminum, and may be of one piece with the vessel. The vessel is formed of walls 16, which may include slots 18,20, and floor 22, which preferably includes a drain as shown at 24.

For maintaining a level of liquid within the vessel, the apparatus includes a pump 26, which is connected via lines 28,30 to a series of liquid-containing reservoirs, such as reservoirs 32,34. Valves 36,38 are provided to regulate the flow of liquid from the reservoirs. The pump also allows circulation of the liquid within the vessel.

To detect the presence or absence of liquid at predetermined levels within the vessel, sensing device 40, described in further detail below with reference to FIG. 2, is provided.

For automated operation of the vessel, pump 26, valves 36,38, sensor 40, and, preferably, drain 24 are operatively connected, via conventional electronic circuitry, to controlling means such as microcontroller 42. The microcontroller board 43 is connected via converter 44 to a user interface 46, which is typically a standard PC or terminal. Further details of these components are provided below in Section II.

With reference to FIG. 2, the sensing device 40 contains a transmitting aerial, or transmitter, 48 and one or more receiving aerials, or receivers, 50,52,54. The aerials are preferably fabricated from copper and soldered to a printed circuit board. The aerials are preferably electroplated with nickel (approx. 5µ) and an outer layer of gold (approx. 10µ) to render them inert to liquid media within the vessel.

All of the aerials are positioned at predetermined levels within the vessel, with the transmitter and one receiver, e.g. 50 in FIG. 2, positioned at or below a lower predetermined level, and preferably at the same level. The transmitter is capable of emitting an electromagnetic signal, preferably a low frequency radio transmission, which may be produced by a low power audio amplifier. The frequency is preferably high enough to provide a stable trace on a cathode ray oscilloscope, but low enough such that transmission in a liquid is detectably stronger than transmission in air. Preferred frequencies are in the range between 200 and 2,000 Hz, and more preferably about 700 Hz. The radiated signal may be a square wave, or, for example, a sinusoidal or triangular signal.

As the level of liquid within the vessel changes, the state of immersion of receivers 50, 52, 54 changes. When a receiver is coimmersed with the transmitter, as shown for receiver 50 in FIG. 2, the former will receive the transmitted signal at a greater intensity by virtue of the increased density (liquid vs. air) of the transmitting medium. In FIG. 2, the liquid level is below the receivers 52, 54 at intermediate and upper levels, respectively. These receivers will receive a signal, if any, that is greatly attenuated in comparison with that at receiver 50.

The probes are shown with a cylindrical profile, though others are possible; e.g., a tapered profile would provide a smaller area of contact with the liquid and thus a more precise transition between the two operating states (wet and dry) of the probes. The tapered profile may include the entire probe, or it may be limited to the tip area of the probe.

A detector 56 connected to the transmitter and receivers detects the respective signal at the receivers. The detected signal may be amplified by a high input impedance amplifier, rectified, and compared to a reference voltage. The detector is connected to microcontroller 42, which determines from these signals which of the receivers is immersed, and thus where the liquid level falls with respect to the predetermined levels of the receivers.

An advantage of the sensing device of the invention is that it does not depend on the conductivity of the liquid. Another advantage is that it does not rely on reflection of signals; thus the transmitter and receiver do not require positioning at specific angles with respect to one another. The device is simple and compact in design, and operation is not affected by extraneous signals from reflection or from transmission through solid surfaces ("crosstalk").

It will be appreciated that, because the pump 26 and valves 36,38 are operably connected to the microcontroller, the liquid level may be corrected automatically in response to the depth sensing device. Liquid may be pumped from (or to) reservoirs 32,34 to increase (or decrease) the level of liquid, e.g. to the next predetermined level detectable by the sensing device. Alternatively, liquid may be drained. The drain 24, shown in FIG. 1A, may be operatively connected to the microcontroller, allowing liquid to be automatically drained, e.g. to the next lower predetermined level detectable by the sensing device, or to empty the vessel. In one embodiment, a pneumatic jack 58 at the opposite end of the vessel from the drain may be operatively connected to the microcontroller and activated to tilt the vessel in the direction of the drain. Alternatively, the floor of the vessel may be sloped toward the drain.

II. Microcontroller Components

The microcontroller is comprised of four main components: a controller board, a standards converter, a system interface, and a user interface.

The controller board itself includes a microprocessor such as an Intel P8052, which may be programmed in an easily understood and edited language such as MCS-52 Basic. The upper memory area is allocated for I/O. One I/O port is a plug-in daughter board to facilitate different operating modes. The controller preferably has sound generation facilities and an on board low power amplifier to drive a small speaker. The controller communicates full duplex serial with a terminal and simplex to a printer. The serial data conforms to the RS-422 standard to provide high noise immunity.

To enable a standard PC to communicate with the controller, an RS-232C to RS-422 standards converter is used. The converter derives power from an RS-422 line supplied from the controller board.

Operation of the valves, pumps and other components of the bath, and monitoring of the liquid level, as described above, is performed by the system interface under the auspices of the controller. This interface uses half of the I/O port described above.

The remaining half of the I/O port is used for the user interface. Four switches (Run, Pause, Continue, Stop) allow the user to control or interrupt proceedings, as described in the following section, with four LED lamps (Ready, Paused, Faulty, Stopped) indicating the current status.

III. Operation of the Vessel Apparatus

Under normal operation of the apparatus, the user inputs, via the user interface, the desired fill time, reaction time, and emptying time of a desired series of liquids (e.g. solvents or solutions) as contained in reservoirs such as shown at 32,34. Operation is controlled by a program such as outlined in the flow chart shown in FIG. 3.

The program starts by testing the auditory feedback system with a short test tone. Time variables, previously set by the user, are read. The lower receiver is then tested to ensure that the vessel is empty. (For this purpose, it is desirable to position the lower receiver, and the transmitter, fairly close to the floor of the vessel.) A depth probe filter routine is included in the program to reject any short term signals (noise). At least the last three of twenty probe tests must be valid in order for the controller to accept that action should be taken with respect to the level of the bath. The speaker component of the microcontroller may be programmed to emit an alarm tone if the vessel is determined to be not empty. The user is then prompted to verify that the vessel should be emptied.

When the vessel is empty, operation continues, by sequentially filling, circulating (reacting), and emptying each liquid (chemical) in the programmed series.

At the start of the fill cycle for the first liquid, the appropriate chemical lamp is lit, and the relevant valve is selected. Time data is read, and the pump and valve are activated.

As shown in the flow chart (FIG. 3), the program can be interrupted (paused) during operation and then resumed or discontinued. If the program is discontinued (stopped), the liquid in the vessel is pumped back to the original reservoir, and the system is reset to a standby mode (waiting for the start command), unless the user inputs another pause command, after which the program can be resumed or stopped. Elapsed time is indicated when the program is resumed.

At the start of the reaction cycle, the valve is turned off, but the pump continues operating to ensure mixing. A "reacting" variable is set so that, during the reaction cycle, unlike the filling and emptying cycles, the clock is not stopped during any paused interval. The program may be paused or discontinued (stopped) during this cycle, as described above.

At the end of the reacting cycle, the pump is stopped, and the "reacting" variable is cleared. During the empty cycle, the liquid is pumped or drained out of the vessel. Again, the program may be paused, resumed, or stopped. In preparation for the next liquid (chemical), all valves are shut, all chemical lamps are lit, and an end tone is sounded periodically until the user enters a pause command. At this point, the ready lamp is lit, and the program returns to the next fill cycle or to a standby mode.

The program preferably includes pauses at appropriate intervals to, e.g. allow pumping pressures to subside. At appropriate times, the program clears the screen at the user interface and/or prints status reports. It may also be set to periodically read the depth probe to monitor the depth of the fluid in the vessel, as described above.

The automated vessel apparatus of the invention may be used, for example, to contact blocks of solid state reaction support pins with a series of solvents or reagent solutions. Such supports are commonly used in, for example, synthesis or sequencing of peptides or oligonucleotides, or in preparation of combinatorial libraries of these compounds or small organic compounds. Positioning of such blocks is facilitated by insertion of legs provided on the blocks into slots provided in the walls of the vessel, as shown, e.g., at 60,62 in FIG. 1. By this means, a smaller volume of liquid is required for circulation than if the entire block were fitted within the vessel.

While the invention has been described with reference to specific methods and embodiments, it will be appreciated that various modifications may be made, such as, for example, provisions for heating and cooling, without departing from the invention.

It is claimed:

1. An automated liquid-level vessel apparatus, comprising
   a vessel defining a container suitable for holding a level of liquid,
   means for adjusting the level of liquid in the container,
   a sensing device for determining whether the level of liquid in the container is between lower and upper preselected levels, said device having (i) a transmitter probe positioned at or below said lower preselected level, and effective to transmit an electromagnetic signal in the low frequency radio range, such that said signal has a detectably greater magnitude after transmission through liquid than after transmission through air;

(ii) a first receiver probe positioned at or below said lower preselected level, and separate from said transmitter probe, where at least one of said probes is positioned at the preselected level, (iii) a second receiver probe positioned at said upper preselected level, and (iv) a detector operatively connected to said receiver probes for detecting the magnitude of electromagnetic signal transmission received at said receiver probes from the transmitter probe, and controlling means operatively connecting said sensing device to said adjusting means to maintain the liquid level in said container between said preselected levels.

2. The apparatus of claim 1, wherein the electromagnetic signal produced by the transmitter probe is in the frequency range between 200 and 2,000 Hz.

3. The apparatus of claim 2, wherein the electromagnetic signal produced by the transmitter probe has a frequency of approximately 700 Hz.

4. The apparatus of claim 1, which further includes a third receiver probe positioned at a selected intermediate level between said upper and lower levels, said third probe being operatively connected to said detector for detecting a liquid level in said container which is between the preselected upper and lower levels.

5. The apparatus of claim 1, wherein said transmitter probe and first receiver probe are both positioned at the lower preselected level.

6. The apparatus of claim 1, wherein said controlling means includes a microprocessor.

7. The apparatus of claim 6, wherein said adjusting means includes a pump operatively associated with the microprocessor, whereby the level of liquid in the vessel may be adjusted in response to the sensing device.

8. An automated liquid-level vessel apparatus, comprising
a vessel defining a container suitable for holding a level of liquid, means for adjusting the level of liquid in the container, a sensing device for determining whether the level of liquid in the container is between lower and upper preselected levels, said device having (i) a transmitter probe positioned at or below said lower preselected level, and effective to transmit an electromagnetic signal in the low frequency radio range, such that said signal has a detectably greater magnitude after transmission through liquid than after transmission through air;

(ii) a first receiver probe positioned at or below said lower preselected level, and separate from said transmitter probe, where at least one of said probes is positioned at the preselected level, (iii) a second receiver probe positioned at said upper preselected level, and (iv) a detector operatively connected to said receiver probes for detecting the magnitude of electromagnetic signal transmission received at said receiver probes from the transmitter probe, and controlling means operatively connecting said sensing device to said adjusting means to maintain the liquid level in said container between said preselected levels, wherein said controlling means includes a microprocessor, and wherein said vessel includes a floor which defines a drain, said drain being operably associated with the microprocessor, and further comprising a pneumatic jack operably associated with the microprocessor and effective to tilt the vessel to effect drainage.

9. An automated liquid-level vessel apparatus, comprising
a vessel defining a container suitable for holding a level of liquid, means for adjusting the level of liquid in the container, a sensing device for determining whether the level of liquid in the container is between lower and upper preselected levels, said device having (i) a transmitter probe positioned at or below said lower preselected level, and effective to transmit an electromagnetic signal in the low frequency radio range, such that said signal has a detectably greater magnitude after transmission through liquid than after transmission through air;

(ii) a first receiver probe positioned at or below said lower preselected level, and separate from said transmitter probe, where at least one of said probes is positioned at the preselected level, (iii) a second receiver probe positioned at said upper preselected level, and (iv) a detector operatively connected to said receiver probes for detecting the magnitude of electromagnetic signal transmission received at said receiver probe from the transmitter probe, and controlling means operatively connecting said sensing device to said adjusting means to maintain the liquid level in said container between said preselected levels, wherein said controlling means includes a microprocessor, and wherein said vessel includes a floor which defines a drain, said drain being operably associated with the microprocessor, and the floor of the vessel is sloped towards the drain.

10. The apparatus of claim 1, for use in immersing blocks of solid state reaction pins in a liquid, wherein said vessel further defines means for positioning the pins within the vessel.

11. The apparatus of claim 10, wherein said vessel includes vessel walls, and said positioning means comprise slots within the vessel walls.

12. A sensing device for determining whether the level of liquid in a container is between lower and upper preselected levels, said device having (i) a transmitter probe positioned at or below said lower preselected level, and effective to transmit an electromagnetic signal in the low frequency radio range, such that said signal has a detectably greater magnitude after transmission through liquid than after transmission through air;

(ii) a first receiver probe positioned at or below said lower preselected level, and separate from said transmitter probe, where at least one of said probes is positioned at the preselected level, (iii) a second receiver probe positioned at said upper preselected level, and (iv) a detector operatively connected to said receiver probes for detecting the magnitude of electromagnetic signal transmission received at said receiver probes from the transmitter probe.

13. The sensing device of claim 12, wherein the electromagnetic signal produced by the transmitter probe is in the frequency range between 200 and 2,000 Hz.

14. The sensing device of claim 13, wherein the electromagnetic signal produced by the transmitter probe has frequency of approximately 700 Hz.

15. The sensing device of claim 12, which further includes a third receiver probe positioned at a selected intermediate level between said upper and lower levels, said third probe being operatively connected to said detector for detecting a liquid level in said container which is between the preselected upper and lower levels.

16. The sensing device of claim 12, wherein said transmitter probe and first receiver probe are both positioned at the lower preselected level.

17. The sensing device of claim 12, wherein each of said probes has a tip area for contact with said liquid, and said tip area has a tapered profile.

* * * * *